United States Patent
Doshi et al.

(10) Patent No.: US 12,430,070 B2
(45) Date of Patent: Sep. 30, 2025

(54) STORAGE CLASS MEMORY DEVICE INCLUDING A NETWORK

(71) Applicant: Intel Corporation, Santa Clara, CA (US)

(72) Inventors: Kshitij Arun Doshi, Tempe, AZ (US); Francesc Guim Bernat, Barcelona (ES); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 766 days.

(21) Appl. No.: 17/560,945

(22) Filed: Dec. 23, 2021

(65) Prior Publication Data

US 2022/0113914 A1    Apr. 14, 2022

(51) Int. Cl.
G06F 3/00        (2006.01)
G06F 3/06        (2006.01)
G06F 12/02       (2006.01)
G06F 12/0888     (2016.01)

(52) U.S. Cl.
CPC .......... *G06F 3/0659* (2013.01); *G06F 3/0604* (2013.01); *G06F 3/0631* (2013.01); *G06F 3/0688* (2013.01); *G06F 12/0238* (2013.01); *G06F 12/0888* (2013.01)

(58) Field of Classification Search
CPC .... G06F 3/0659; G06F 3/0604; G06F 3/0631; G06F 3/0688; G06F 12/0238; G06F 12/0888
See application file for complete search history.

(56) References Cited

U.S. PATENT DOCUMENTS

2015/0199298 A1    7/2015    Strong et al.
2018/0089115 A1*   3/2018    Schmisseur ......... G06F 13/4282

FOREIGN PATENT DOCUMENTS

WO    2018032510    2/2018

OTHER PUBLICATIONS

"European Application Serial No. 22204293.9, Extended European Search Report mailed May 30, 2023", 7 pgs.

\* cited by examiner

*Primary Examiner* — Craig S Goldschmidt
(74) *Attorney, Agent, or Firm* — Schwegman Lundberg & Woessner, P.A.

(57) ABSTRACT

Systems and techniques for storage-class memory device including a network interface are described herein. A write for a network communication is received by the host interface of the memory device. Here, the network communication includes a header. The header is written to a non-volatile storage array managed by a memory controller. A network command is detected by the memory device. Here, the network command includes a pointer to the header in the non-volatile storage array. The header is retrieved from the non-volatile storage array and a packet based on the header is transmitted via a network interface of the memory controller.

29 Claims, 11 Drawing Sheets

STORAGE CLASS MEMORY DEVICE INCLUDING A NETWORK

TECHNICAL FIELD

This disclosure generally relates to systems and techniques for a storage-class memory device, and more specifically, to a storage-class memory device including a network.

BACKGROUND

Traditional networked computing systems include a distinct network interface (e.g., network interface controller (NIC)), processor, and working memory (e.g., random access memory (RAM)). Generally, the processor writes network payloads and configuration information to the memory. The processor then instructs the NIC to transmit a message via, for example, a direct memory access (DMA) instruction or by transferring the configuration and payload directly to the NIC. The NIC then transmits the message (e.g., using one or more packets) and provides an indication of success to the processor. A typical workflow for Ethernet, for example, involves several interactions between the processor, the working memory, and the NIC, to, for example, prime the NIC to accept a transmission configuration, relay the transmission configuration, and then relay the payload. The processor may work, through its cache hierarchy, on data in memory over high bandwidth, low latency channels through memory controllers. The processor may communicate with the NIC over a peripheral component interconnect express (PCIe) link, to send or receive packets to or from the NIC. In sending a message, a thread of threads may prepare a message in the form of an io-vector describing the different segments of a message. The io-vector may be serialized into a linearly contiguous message by the same or some other threads, and then packetized and linked to various protocol layering frames.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
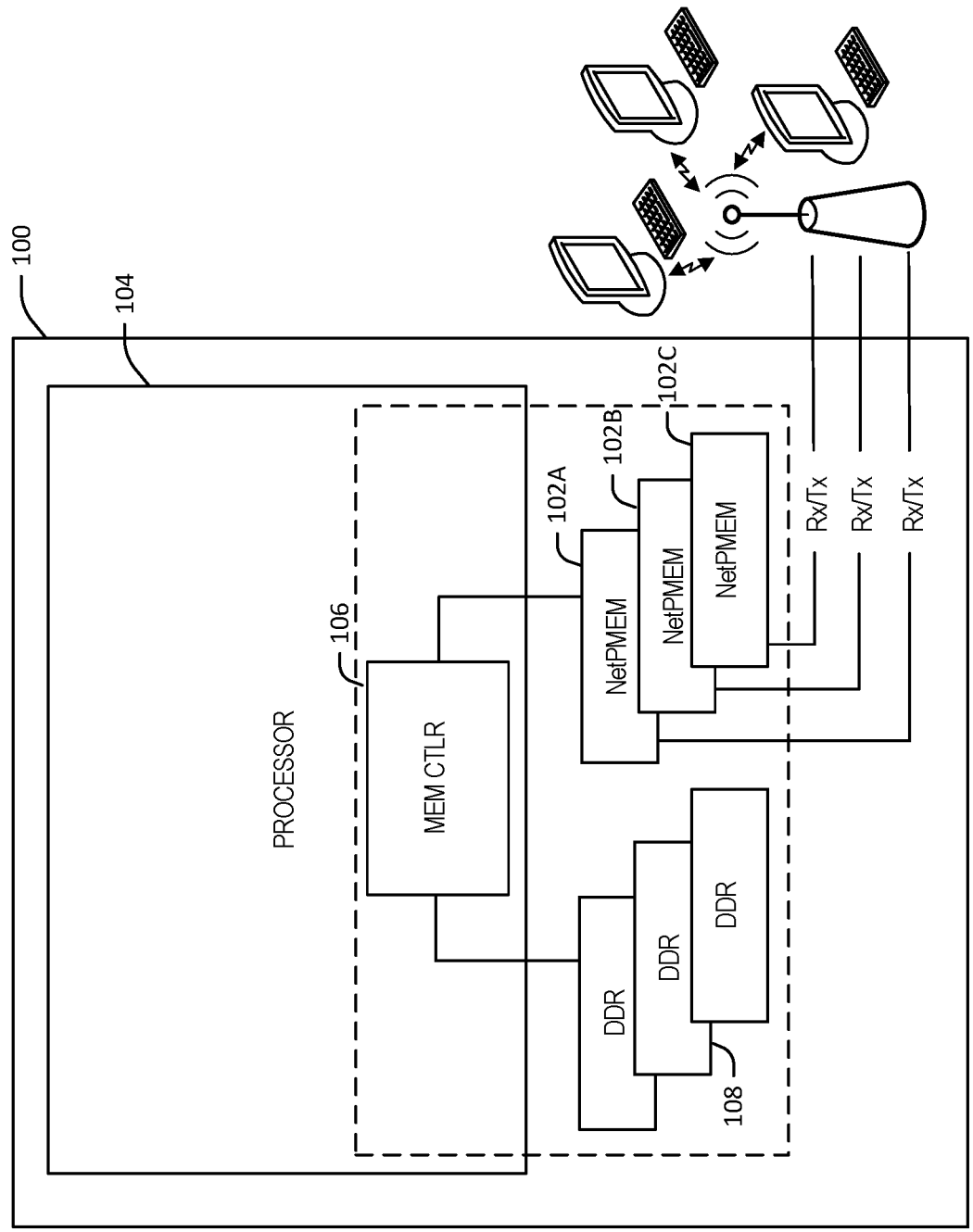
FIG. 1 is a block diagram illustrating a memory device system, according to an embodiment.

Communications between a NIC and a processor generally involve a thread instructing the NIC about packets to be sent. Here, the packet is delivered through the NIC using a multi-step process of back-and-forth interactions between the processor and the NIC. These interactions present an issue of increased latency caused by round-trip communications between the processor, the working memory, and the NIC. Further, preparing, serializing, and transforming data (such as for encryption, compression, or alignment) may use signifimayt central processing unit (CPU) resources.

To address these issues, a memory device performing a combination of network, memory, and storage functions may be used to minimize latency in an elegant and cost effective manner. The memory device may enable the CPU to perform network operations as typical load-store memory interactions, the memory device using the data to perform the network operation with on onboard NIC. Thus, the CPU writes the network configuration and payload to the memory device as if writing to traditional working memory and the memory device proceeds to transmit the payload in accordance with the network configuration without further interaction with the CPU. In an example, the CPU instructs the memory device to perform the network operation by writing a pointer to the data (e.g., the network configuration or the payload) into a pre-designated memory address. The memory device monitors the address, taking the pointer, retrieving the data, and sending the message. The proximity of the data and the NIC within the memory device greatly reduces latency in these network operations. In an example, the memory device writes the result of the network operation back to the memory address, where the CPU may simply perform a read to obtain the result The latency benefit is also realized on received network communications. In the reverse, the memory device may receive data and fill up header and payload buffers in itself. Here, the CPU may read the buffers just as it would read normal dynamic random-access memory (DRAM). In an example, the memory controller, or other processing circuitry of the memory device, may also perform various computations, enabling these tasks to be offloaded from the CPU.

Because the memory device includes the NIC, the memory device may independently communicate with similarly equipped memory devices to, for example, create remote memory pools. Such memory pools may increase data resiliency. Thus, the storage-class memory device may effectively become a peer extension of the CPU for network operations. The CPU may directly load-store various ranges in storage device and then issue an ordinary load-store based transmit (Tx) command (e.g., writing to the pre-designated memory address in the memory device). The memory device (e.g., the memory controller in the memory device) then carries out the transmission operations according to the networking protocols of the NIC. Such an arrangement enables an aggregate network throughput reaching many terabits at memory-access latencies and load-store semantics. Accordingly, ordinary memory-based queues are transformed into peer-to-peer memory-based coordination.

FIG. 1 is a block diagram illustrating a memory device system, according to an embodiment. A storage-class memory system 100 may include one or more storage-class memory devices 102A, 102B, 102C (collectively referred to as 102). In an example, the storage-class memory device 102 may include non-volatile memory (NVM) (e.g., flash memory, Intel® Optane®, Intel® 3D XPoint™ memrister technologies, etc.). Because the storage-class memory devices 102 include network communications and non-volatile memory, the storage-class memory devices 102 may also be referred to as network persistent memory (NetPmem). The storage-class memory devices 102 may also include volatile memory (e.g., a Synchronous Dynamic Random Access Memory (SDRAM), Dynamic Random Access Memory (DRAM) 116, RAMBUS Dynamic Random Access Memory (RDRAM), etc.). The storage-class memory devices 102 may include a NIC. For example, the storage-class memory device may function both as memory and as a NIC. Here, the NIC, blended with a memory dual in-line memory module (DIMM) component, may be communicatively coupled to a memory controller 106 of a processor 104 on a Double-Data Rate (DDR) channel 108 rather than being accessed through PCIe interfaces. The communication between CPU and NIC may occur, from the software perspective, through ordinary load/store instructions instead of doorbells and completion messages.

In an example, the system 100 may include different trust domains enforced by, for example, a trusted execution environment (TEE). In general, the processor 104 and devices supported by the memory controller 106 share a boundary of trust. Accordingly, both the DDR RAM and the storage-class memory devices 102 have the same trust level. Accordingly, TEE coverage over memory operations—such as loads or stores—extends to the memory-network operations described below. In contrast other input-output (I/O) device—such as a network interface controller (NIC) or typical solid state disk (SSD)—must be explicitly integrated into a TEE trust boundary during boot time, during mount time, or during some other initialization step. Accordingly, operations with the storage-class memory devices 102 enable the processor 104 to perform I/O through ordinary memory load-store semantics, while the memory controller 106 (or accelerators) transparently complete more complex transactions under the security of the TEE.

Figure 2:
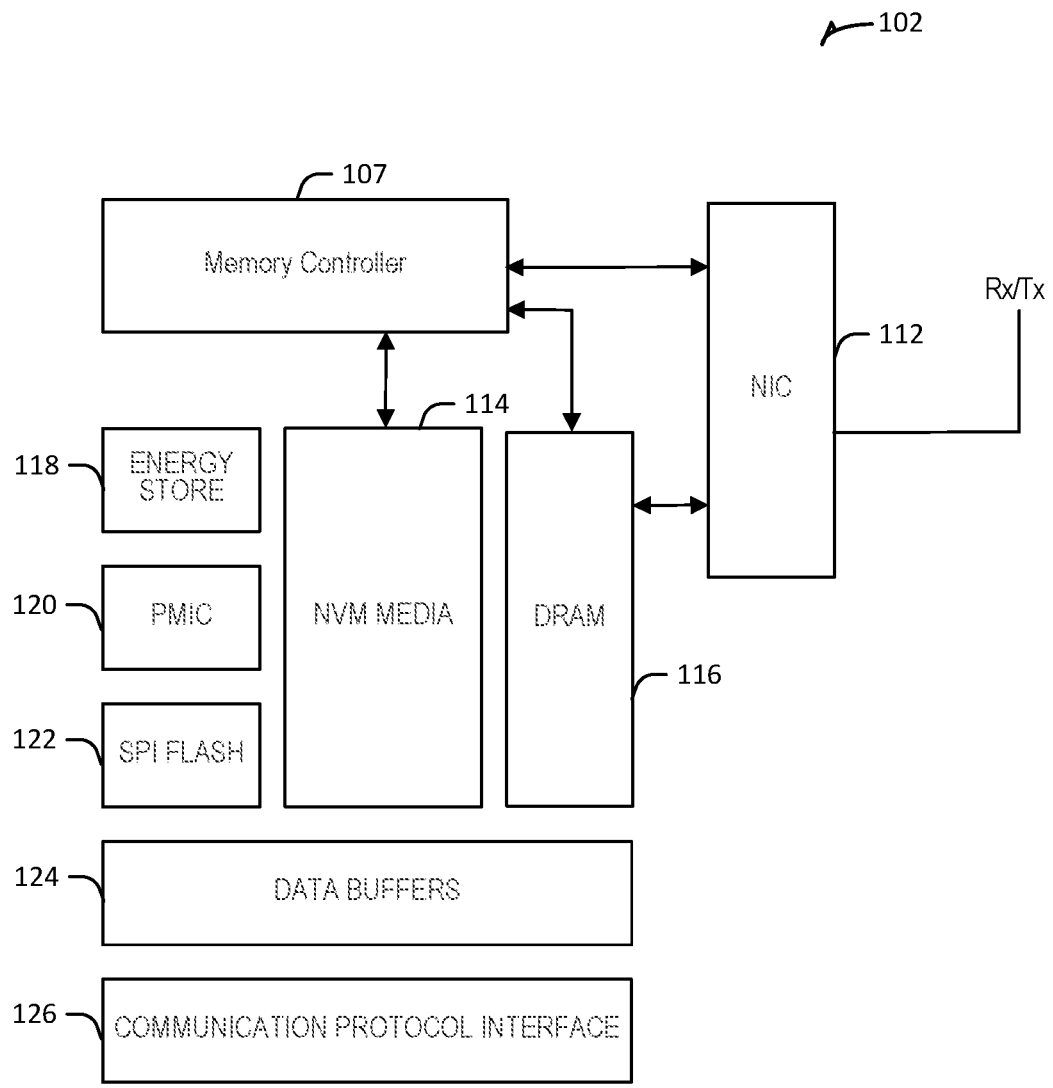
FIG. 2 is a block diagram illustrating a memory device, according to an embodiment.

FIG. 2 is a block diagram illustrating a storage-class memory device 102, according to an embodiment. As illustrated, the storage-class memory device 102 includes a memory controller 107 a NIC 112, an NVM media 114, and supplemental memory such as DRAM 116. Thus, the NIC 112 is integral to (e.g., a part of) the storage-class memory device 102, collocating the NIC 112, the NVM media 114, and the memory controller 107 into a single package. The storage-class memory device 102 may also include or use an energy store 118 (e.g., battery, super capacitor, etc.), a power management integrated circuit (PMIC) 120, a Serial Peripheral Interface (SPI) flash component 122, one or more data buffers 124, and a communication protocol interface 126.

In an example, the NIC 112 implements receive (Rx) and transmit (Tx) operations on a wired or wireless interface. The memory controller 107 may perform traditional NIC operations as well as other structured memory operations such as data movement—between external memory used by the memory controller and a supplemental memory cache (e.g., in the supplemental memory) inside the storage-class memory device 102 that is also accessible to the embedded NIC 112. In an example, the supplemental memory component may be configured as a local cache such as for an address indirection table (AIT) residing in the NVM media. The supplemental memory component such as the DRAM 116 may also be configured as a local cache for data in transit to or from the NVM media 114 to an expanded cache for packet and message processing operations performed by the memory controller 107. In an example, stores from one or more CPUs may be sent directly to NVM media 114 without being first staged by a volatile cache such as the DRAM 116, so that the CPU may cover data updates in volatile cache with write-ahead logging (WAL) in the NVM media 114. A high transmit and receive priority accorded to write-ahead logs makes such write-ahead log records become durable in store order and stable through consistent update at more than one storage-class memory network device. In an example, the memory controller 107 may control the network operations of the storage-class memory device 102 by using various shared memory structures between memory controllers and memory devices.

Figure 3:
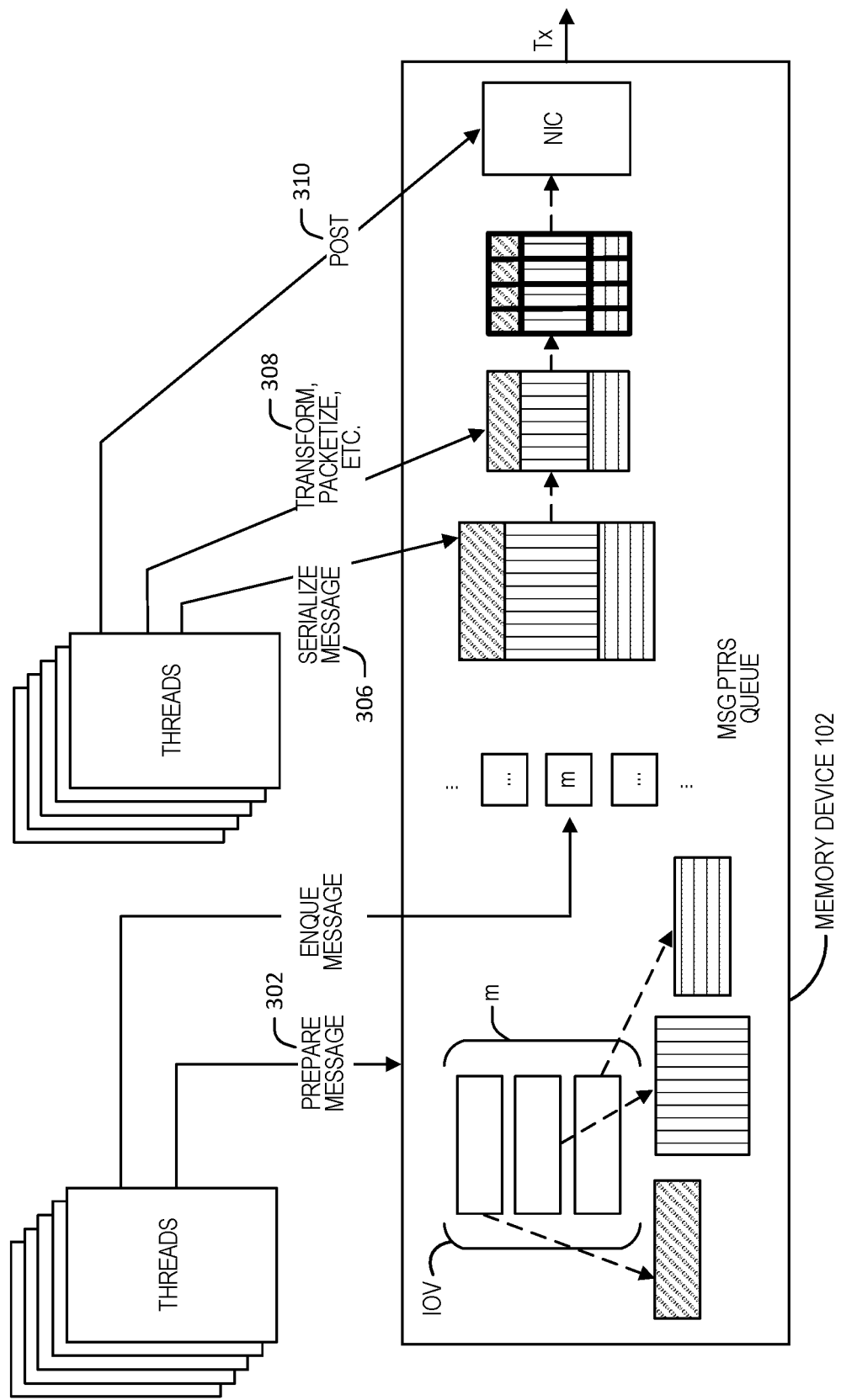
FIG. 3 illustrates a technique for sending messages using a memory device, according to an embodiment.

FIG. 3 illustrates a technique for sending messages using a memory device, according to an embodiment. In an example, general data distributed in a storage-class memory device 102 may be pulled into input output-vectors (IOV or io-vectors), into messages, and then into transportable chunks ("packets") and then given to a NIC. For example, when sending a message, at operation 302 a thread of threads may prepare a message in the form of an IOV describing the different segments of a message, at operation 306 that IOV may be serialized into a linearly contiguous message by the same or other threads, and at 308 the message may be packetized and linked to various protocol layering frames. This operation 308 may include other mechanical transformations over data, such as compressing, encoding, encrypting, etc., which may be performed by local embedded fixed or programmable logic within the storage-class memory network device. After that, at operation 310 some thread may instruct the NIC about the packet(s) to be sent, the packet may be delivered through the NIC. In memory devices described herein, a multistep interaction of some existing systems is avoided in the storage-class memory device 102 because the local memory controller in the storage-class memory device 102 may directly handle the dataflow through its embedded NIC. Also, software operations of marshalling and packetizing may be offloaded as highly mechanical actions to the memory controller, may effectively function as in-network compute that has direct access to content in memory in the storage-class memory device 102 and/or in the supplemental memory cache, where it may assemble the needed message bodies and packetize them for send (as depicted in FIG. 3), or depacketize and deserialize for receives. For example, a host interface of the memory device may receive a write for a network communication. The network communication may include a header and the header may be written to a non-volatile storage array of the NVM managed by a memory controller. A network command including a pointer to the header may be detected and used such as to retrieve the header from the storage array. A packet based on the header may be retrieved from the storage array. In an example, a packet may also be received via the network interface. The received packet may be depacketized and deserialized such that a header from the received network communication may be written to the non-volatile storage array of the NVM.

Figure 4:
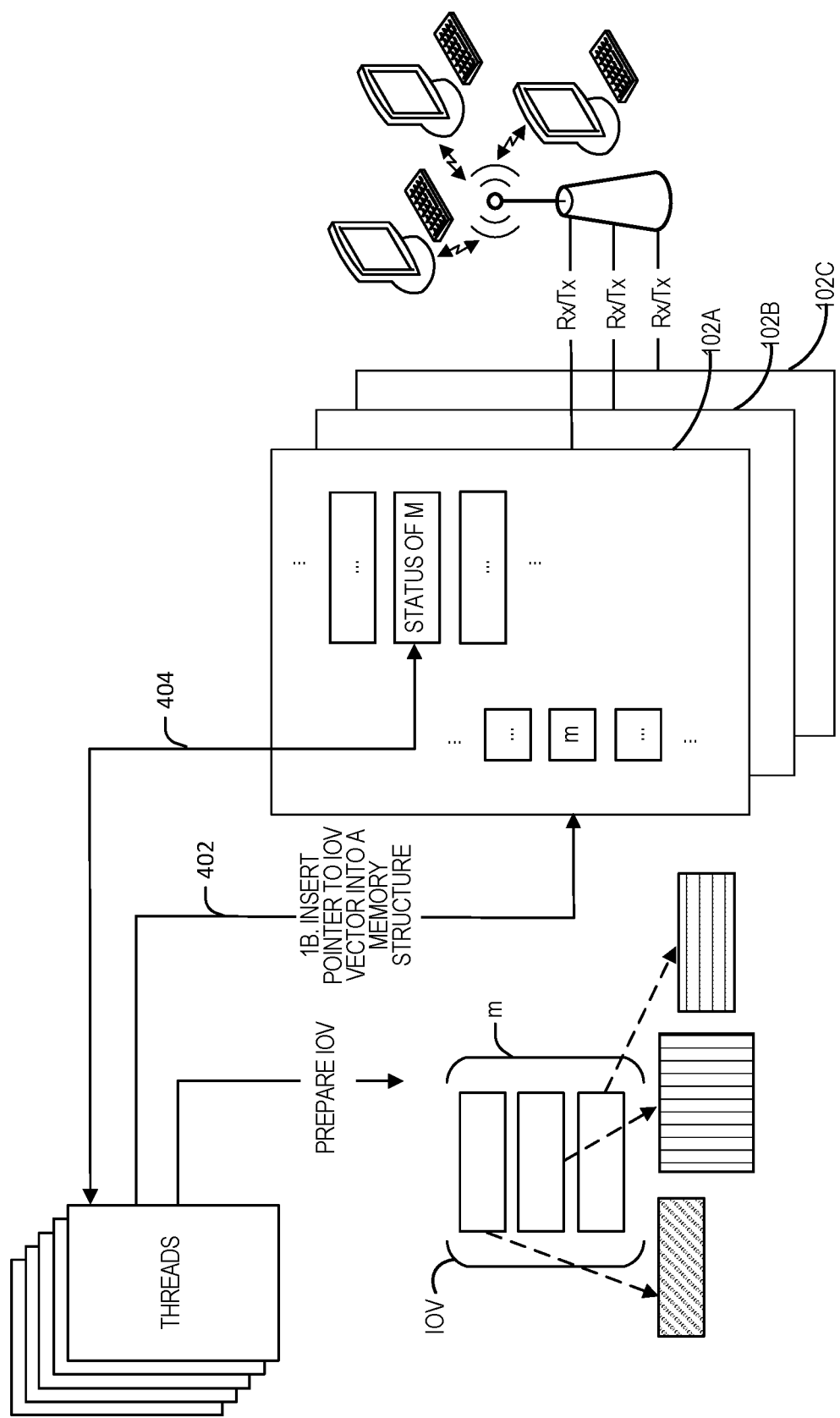
FIG. 4 illustrates a send operation using a memory device, according to an embodiment.

FIG. 4 illustrates a send operation using a memory device, according to an embodiment. In an example, a handoff may be performed from a network stack to the storage-class memory devices 102. At 402, a thread running on the memory controller may create a message header in NVM, and then instruct the memory devices 102 by writing a pointer to this header in a range of memory pre-assigned for such a purpose between the memory controller and memory controller software. At 404, the memory devices may update the status of the send operation in a memory location that is freely monitored by ordinary loads from software.

In another example of a send operation, accelerators such as Intel® QuickAssist Technology (QAT), IAX or Intel® Data Streaming Accelerator (DSA) may be included or used with a storage-class memory device 102 such as to help to marshal data from different caches and different DRAM or NVM ranges into a single contiguous range in a given storage-class memory device 102. Such coordination may be performed either by software on the memory controller, or alternatively or additionally by extending capabilities for QAT, IAX, DSA, etc. to receive Accelerator Interfacing Architecture (AIA) enqueue commands from the memory controllers directly. In this way, complex, compute-intensive, or system-wide memory access operations may be reassigned to purpose-optimized volume components (like QAT, DSA, IAX) instead of being embedded into the respective memory controllers of the memory devices 102.

Figure 5:
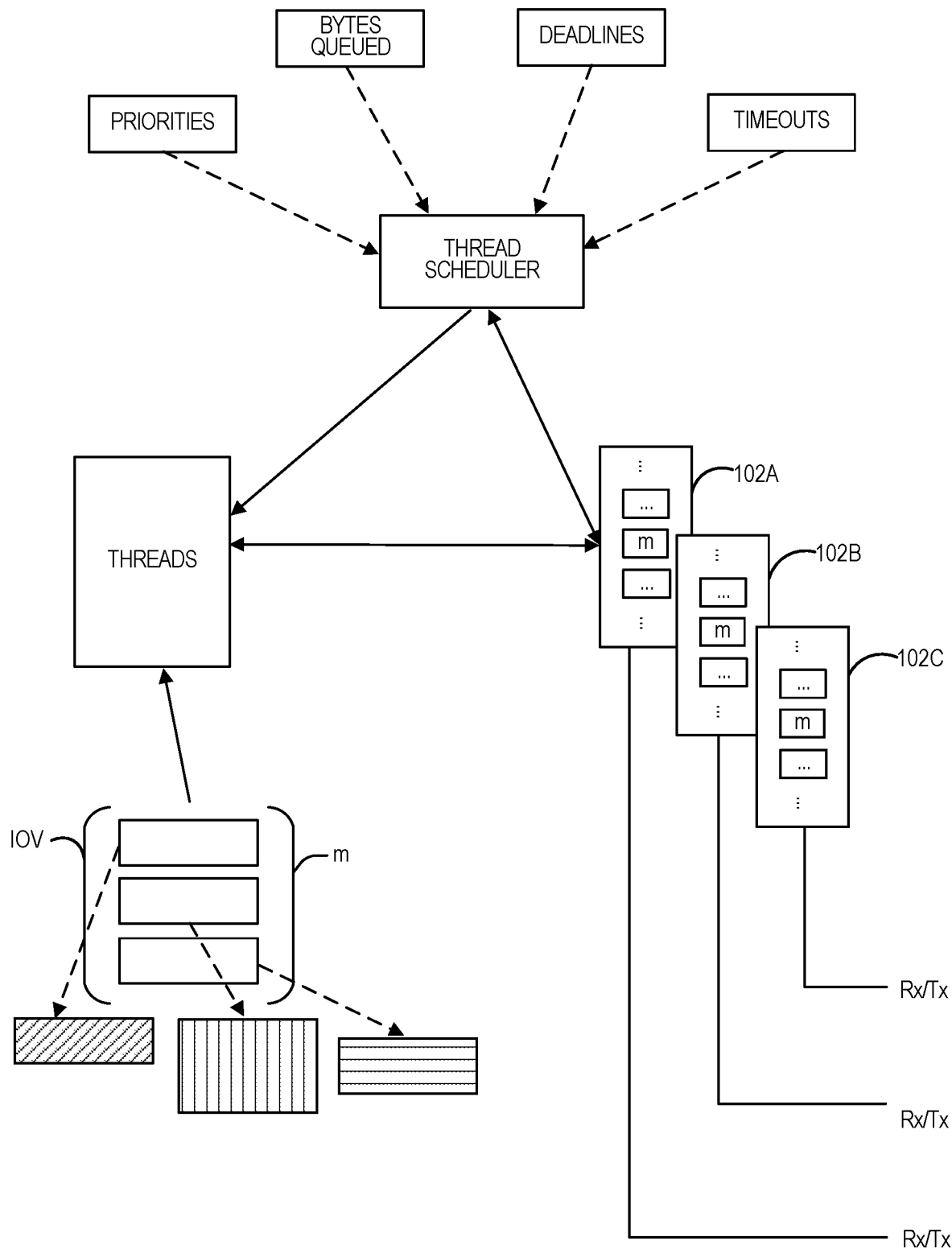
FIG. 5 illustrates an operating system using a memory device, according to an embodiment.

FIG. 5 illustrates an operating system using a memory device, according to an embodiment. In an example, synergistic changes that may be implemented in operating system and library thread schedulers to benefit from the functionality of the storage-class memory devices 102. For example, a receive operation may include messages arriving at a storage-class memory device. The messages may be buffered in the supplemental cache or another cache local to the supplemental memory. The buffering may also be split between the supplemental cache, which may be external to the NVM, and reserved memory on the NVM. The memory controller may update a metadata buffer by which it may enumerate various indicators including an amount of data buffered at storage-class memory device 102 for various virtual channels or connection handles. In an example, a thread scheduler (library or OS based) may monitor the metadata and may adjust the priorities or deadlines with which different threads are to be dispatched. This may help ensure the processing of received data is proceeding at a pace commensurate with that at which the buffers are filling up. Here, application threads are not only woken up in a timely fashion, but are also given greater or lesser priority according to the rate at which bytes arrive, the importance assigned to that application, and other factors that are baked into the handling of a given scheduling class. Similarly, during send operations, threads may begin send operations and then be paused and reactivated at a pace commensurate with that at which the storage-class memory device 102 is able to drain the data for their particular connection handles.

Figure 6:
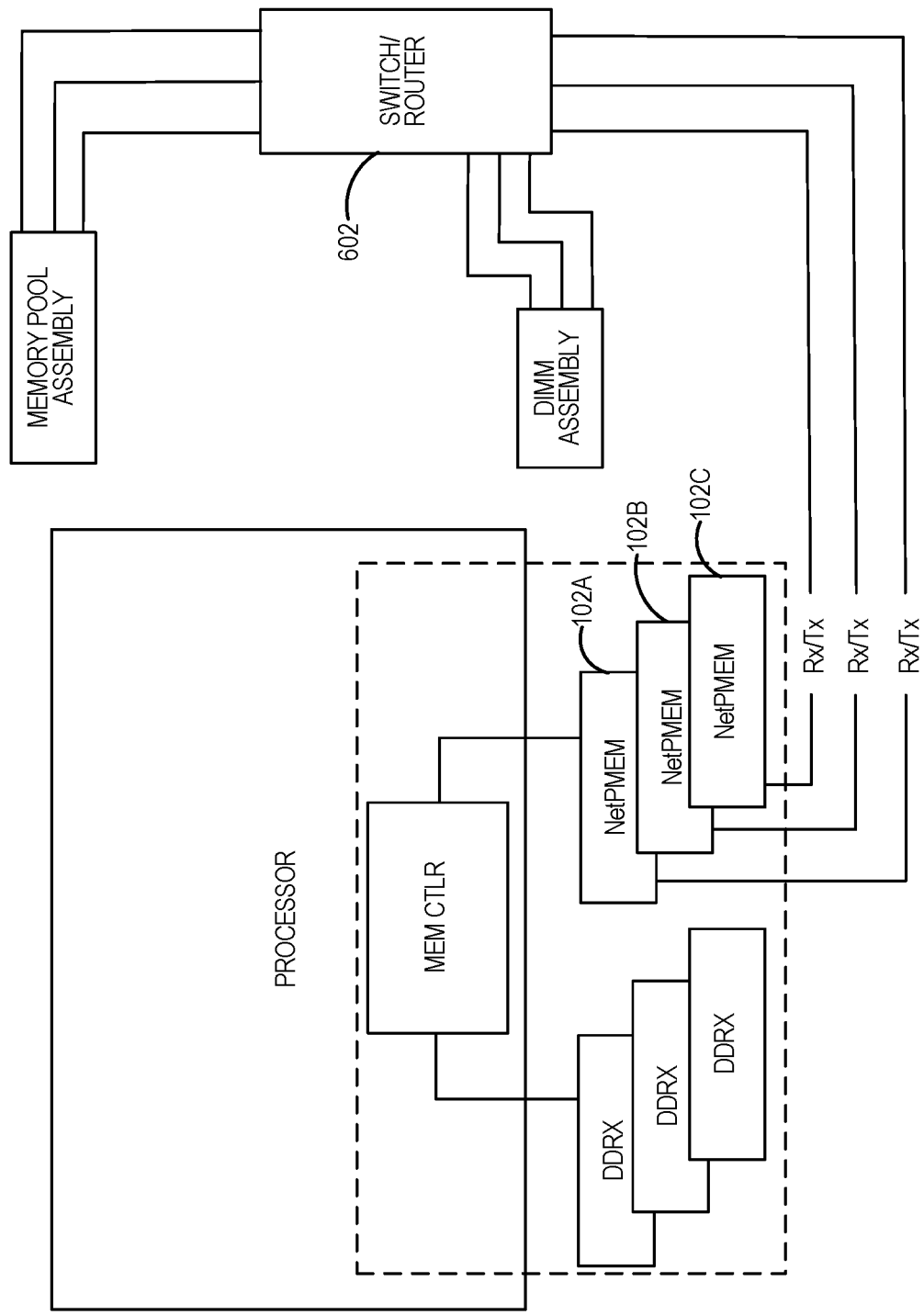
FIG. 6 depicts multiple different memory devices in a machine connected in a machine level cluster through a switch or router, according to an embodiment.

FIG. 6 depicts multiple different memory devices in a machine connected in a machine level cluster through a switch or router, according to an embodiment. A plurality of storage-class memory devices 102 included in a machine may be united into a machine level NIC cluster through a switch or router 602 such as integrated into a classic NIC or an SoC-based switch. The multiple memory device DIMMs may aggregate their traffic capacities through such NIC/Switch/Routers at a host machine level. In an example, this aggregation may be achieved by traces in the motherboard or through integration into an SoC. Also, for backwards compatibility to some other systems, PCIe based NICs may provide for a common connection bus. Also, Ethernet may be used as the wire protocol for transmits and receives.

In an example, a root of trust (RoT) sub-component may be included in or used by the memory controller, the DIMM assembly, or the Memory Pool Assembly. For example, a Device Identity Composition Engine (DICE) may be included or used and an RoT engine may help ensure the memory controller has attestable identifiers or a trustworthy initialization and state change (e.g., as when a FW update is applied to controller firmware). The RoT may also derive cryptographic keys useful for securing the connections over a secure protocol such as a Security Protocol and Data Model (SPDM) standard. Use of such protocols may help allow for attestation of controller endpoints across both logical and physical interfaces used by NetPMem. In an example, each respective NetPmem may utilize different cryptographic keys for protecting, isolating, or attesting tenant or system swim lanes that may be aligned with NetPmem Rx/Tx traffic.

MEM CTLR may interact with on-host/on-die memory such as DDRX and Compute Express Link (CXL) attached memory devices. CXL is a coherent memory interconnect running over a peripheral component interconnect (PCI) express (PCIe) physical link. Such coherent (e.g., cached coherent) interconnects enable processor (e.g., CPU) to device (e.g., memory, cache, accelerators, etc.) semantics over a packetized connection, enabling a more flexible ability for the processor to interact with these devices as if dedicated interfaces were present (e.g., the double data rate (DDR) interface for RAM). The references to CXL throughout may be replaced with any coherent interconnect that enables a unified, coherent memory space between the processor and connected devices as CXL does. The MEM CTLR may have a trusted path (hardware defined) or logical bus connection to CXL or DDRX such that it may derive cryptographic keys for protecting/isolating/attesting tenant or system specific memory ranges that may correspond to NetPmem Rx/Tx swim lanes.

In an example, remote or pooled memory may be accessible directly at the hardware level over a CXL standard and may be shared and disaggregated dynamically across the hosts to which it is connected. The pooled memory may also incorporate the memory devices 102 and feed into a host adapter. Here, neighboring machines may use pooled memory as a directly attached, active component in the network fabric such as to substantially boost both data redundancy and resilience to link failures. This may be possible since the storage-class memory system includes the ability to overlay network connections through shared memory pools. In another example, a host may be connected such as by Ethernet to a Top of Rack (ToR) switch to other rack mounted hosts and further connected by a spine switch to other racks as an alternative or additional configuration. For example, the pooled memory devices' Rx/Tx interfaces may be linked directly via the ToR switch.

Because the memory in a memory device DIMM is durable, high speed distributed access to key value stores may be possible in such arrangements, which may facilitate resilient distributed operations of applications with components like home location registries (HLR) in a virtual network function (VNF) network, tips of blockchain hashes, read-write latches that serialize accesses to rarely mutated directories of resources and credentials. As a result, data that is rarely mutated, security, performance, or resiliency may be placed in locations from where wide scale flat access is possible through memory mapping without creating chokepoints for managing consistency.

Figure 7A:
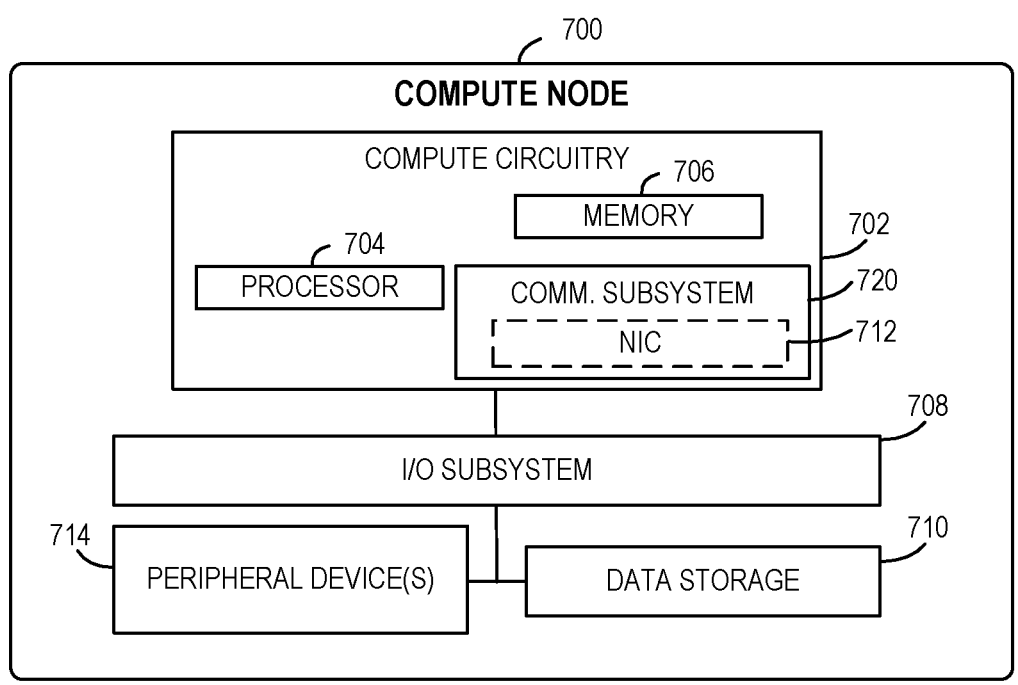
FIG. 7A provides an overview of example components for compute deployed at a compute node in an edge computing system, according to an embodiment.
Figure 7B:
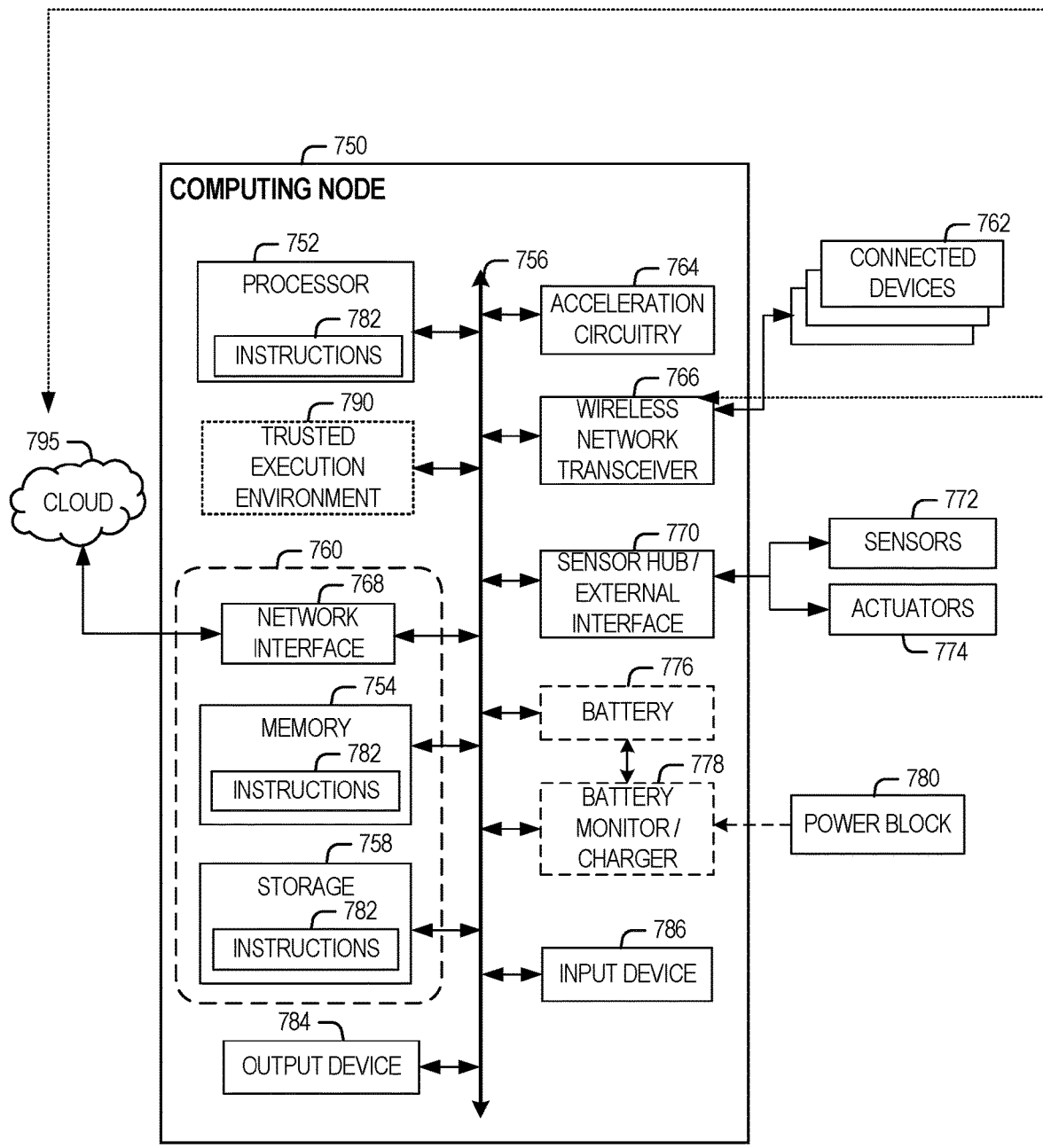
FIG. 7B provides a further overview of example components within a computing device in an edge computing system, according to an embodiment.

FIGS. 7A & FIG. 7B illustrate a block diagram of an example of components that may be present in a computing node 750 for implementing the techniques (e.g., operations, processes, methods, and methodologies) described herein. The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multi-core processor(s), a microcontroller, a processing unit, a specialized or special purpose processing unit, or other processor or processing/controlling circuit.

In some examples, the processor 704 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 704 may work in coordination with each other to execute many types of operations and instructions within and on behalf of the compute node 700.

The memory 706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 706 may be integrated into the processor 704. The memory 706 may store various software and data used during operation such as one or more applications, data operated on by the application(s), libraries, and drivers.

The compute circuitry 702 is communicatively coupled to other components of the compute node 700 via the I/O subsystem 708, which may be embodied as circuitry or components to facilitate input/output operations with the compute circuitry 702 (e.g., with the processor 704 or the main memory 706) and other components of the compute circuitry 702. For example, the I/O subsystem 708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), or other components and subsystems to facilitate the input/output operations. In some examples, the I/O subsystem 708 may form a portion of a system-on-a-chip (SoC) and be incorporated, along with one or more of the processor 704, the memory 706, and other components of the compute circuitry 702, into the compute circuitry 702.

The one or more illustrative data storage devices 710 may be embodied as any type of devices configured for short-term or long-term storage of data such as, for example, memory devices and circuits, memory cards, hard disk drives, solid-state drives, or other data storage devices. Individual data storage devices 710 may include a system partition that stores data and firmware code for the data storage device 710. Individual data storage devices 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device. The communication circuitry 712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 712 includes a network interface controller (NIC) 720, which may also be referred to as a host fabric interface (HFI). The NIC 720 may be embodied as one or more add-in-boards, daughter cards, network interface cards, controller chips, chipsets, or other devices that may be used by the compute node 700 to connect with another compute device. In some examples, the NIC 720 may be embodied as part of a system-on-a-chip (SoC) that includes one or more processors, or is included on a multichip package that also contains one or more processors. In some examples, the NIC 720 may include a local processor or a local memory that are both local to the NIC 720. In such examples, the local processor of the NIC 720 may be capable of performing one or more of the functions of the compute circuitry 702 described herein. Additionally, or alternatively, in such examples, the local memory of the NIC 720 may be integrated into one or more components of the client compute node at the board level, socket level, chip level, or other levels.

Additionally, in some examples, a respective compute node 700 may include one or more peripheral devices 714. Such peripheral devices 714 may include any type of peripheral device found in a compute device or server such as audio input devices, a display, other input/output devices, interface devices, or other peripheral devices, depending on the particular type of the compute node 700. In further examples, the compute node 700 may be embodied by a respective compute node (whether a client, gateway, or aggregation node) in a computing system or like forms of appliances, computers, subsystems, circuitry, or other components.

This computing node 750 provides a closer view of the respective components of node 700 when implemented as or as part of a computing device (e.g., as a mobile device, a base station, server, gateway, etc.). The computing node 750 may include any combinations of the hardware or logical components referenced herein, and it may include or couple with any device usable with a communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the computing node 750, or as components otherwise incorporated within a chassis of a larger system.

The computing device 750 may include processing circuitry in the form of a processor 752, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 752 may be a part of a system on a chip (SoC) in which the processor 752 and other components are formed into a single integrated circuit, or a single package, such as the Edison™ or Galileo™ SoC boards from Intel Corporation, Santa Clara, California. As an example, the processor 752 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 752 and accompanying circuitry may be provided in a single socket form factor, multiple socket form factor, or a variety of other formats, including in limited hardware configurations or configurations that include fewer than all elements shown in FIG. 7B.

The processor 752 may communicate with a system memory 754 over an interconnect 756 (e.g., a bus). Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example, the storage 758 may be implemented via a solid-state disk drive (SSDD). Other devices that may be used for the storage 758 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vamaycy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 756 may couple the processor 752 to a transceiver 766, for communications with the connected devices 762. The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected devices 762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the computing node 750 may communicate with close devices, e.g., within about 10 meters, using a local transceiver based on Bluetooth Low Energy (BLE), or another low power radio, to save power. More distant connected devices 762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 766 (e.g., a radio transceiver) may be included to communicate with devices or services in a cloud (e.g., a cloud 795) via local or wide area network protocols. The wireless network transceiver 766 may be a low-power wide-area (LPWA) transceiver that follows the IEEE 802.15.4, or IEEE 802.15.4g standards, among others. The computing node 750 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP (Third Generation Partnership Project) specifications, such as Long-Term Evolution (LTE) and 5th Generation (5G) communication systems, discussed in further detail at the end of the present disclosure. A network interface controller (NIC) 768 may be included to provide a wired communication to nodes of the cloud 795 or to other devices, such as the connected devices 762 (e.g., operating in a mesh). The wired communication may provide an Ethernet connection or may be based on other types of networks, such as Controller Area Network (MAY), Local Interconnect Network (LIN), DeviceNet, ControlNet, Data Highway+, PROFIBUS, or PROFINET, among many others. An additional NIC 768 may be included to enable connecting to a second network, for example, a first NIC 768 providing communications to the cloud over Ethernet, and a second NIC 768 providing communications to other devices over another type of network.

Given the variety of types of applicable communications from the device to another component or network, applicable communications circuitry used by the device may include or be embodied by any one or more of components 764, 766, 768, or 770. Accordingly, in various examples, applicable means for communicating (e.g., receiving, transmitting, etc.) may be embodied by such communications circuitry.

The computing node 750 may include or be coupled to acceleration circuitry 764, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific computing tasks for service management and service operations discussed elsewhere in this document.

The interconnect 756 may couple the processor 752 to a sensor hub or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, barometric pressure sensors, and the like. The hub or interface 770 further may be used to connect the computing node 750 to actuators 774, such as power switches, valve actuators, an audible sound generator, a visual warning device, and the like.

In some optional examples, various input/output (I/O) devices may be present within or connected to, the computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the computing node 750. A display or console hardware, in the context of the present system, may be used to provide output and receive input of a computing system; to manage components or services of a computing system; identify a state of a computing component or service; or to conduct any other number of management or administration functions or service use cases.

A battery 776 may power the computing node 750, although, in examples in which the computing node 750 is mounted in a fixed location, it may have a power supply coupled to an electrical grid, or the battery may be used as a backup or for temporary capabilities. The battery 776 may be a lithium ion battery, or a metal-air battery, such as a zinc-air battery, an aluminum-air battery, a lithium-air battery, and the like.

A battery monitor/charger 778 may be included in the computing node 750 to track the state of charge (SoCh) of the battery 776, if included. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776. The battery parameters may be used to determine actions that the computing node 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the computing node 750. A wireless battery charging circuit, such as an LTC4020 chip from Linear Technologies of Milpitas, California, among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application specific integrated circuit (ASIC).

In an example, the instructions 782 provided via the memory 754, the storage 758, or the processor 752 may be embodied as a non-transitory, machine-readable medium 760 including code to direct the processor 752 to perform electronic operations in the computing node 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 782 on the processor 752 (separately, or in combination with the instructions 782 of the machine readable medium 760) may configure execution or operation of a trusted execution environment (TEE) 790. In an example, the TEE 790 operates as a protected area accessible to the processor 752 for secure execution of instructions and secure access to data. Various implementations of the TEE 790, and an accompanying secure area in the processor 752 or the memory 754 may be provided, for instance, through use of Intel® Software Guard Extensions (SGX) or ARM® Trust-Zone® hardware security extensions, Intel® Management Engine (ME), or Intel® Converged Security Manageability Engine (CSME). Other aspects of security hardening, hardware roots-of-trust, and trusted or protected operations may be implemented in the device 750 through the TEE 790 and the processor 752.

Figure 8:
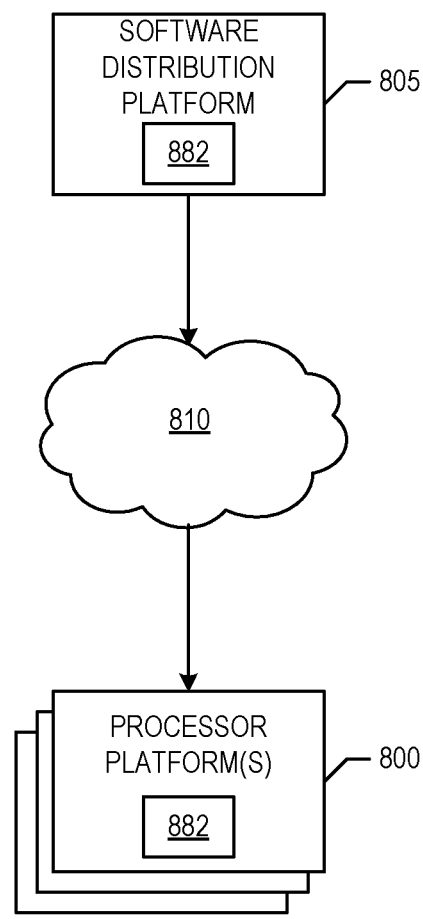
FIG. 8 illustrates an example software distribution platform to distribute software, according to an embodiment.

FIG. 8 illustrates an example software distribution platform 805 to distribute software, such as the example computer readable instructions 882 of FIG. 8, to one or more devices, such as example processor platform(s) 800 or connected devices. The example software distribution platform 805 may be implemented by any computer server, data facility, cloud service, etc., capable of storing and transmitting software to other computing devices (e.g., third parties, or connected devices). Example connected devices may be customers, clients, managing devices (e.g., servers), third parties (e.g., customers of an entity owning or operating the software distribution platform 805). Example connected devices may operate in commercial or home automation environments. In some examples, a third party is a developer, a seller, or a licensor of software such as the example computer readable instructions 882 of FIG. 8. The third parties may be consumers, users, retailers, OEMs, etc. that purchase or license the software for use or re-sale or sub-licensing. In some examples, distributed software causes display of one or more user interfaces (UIs) or graphical user interfaces (GUIs) to identify the one or more devices (e.g., connected devices) geographically or logically separated from each other (e.g., physically separated IoT devices chartered with the responsibility of water distribution control (e.g., pumps), electricity distribution control (e.g., relays), etc.).

In the illustrated example of FIG. 8, the software distribution platform 805 includes one or more servers and one or more storage devices. The storage devices store the computer readable instructions 882, which may correspond to the example computer readable instructions illustrated in the figures and described herein. The one or more servers of the example software distribution platform 805 are in communication with a network 810, which may correspond to any one or more of the Internet or any of the example networks described herein. In some examples, the one or more servers are responsive to requests to transmit the software to a requesting party as part of a commercial transaction. Payment for the delivery, sale or license of the software may be handled by the one or more servers of the software distribution platform or via a third-party payment entity. The servers enable purchasers or licensors to download the computer readable instructions 882 from the software distribution platform 805. For example, the software, which may correspond to the example computer readable instructions described herein, may be downloaded to the example processor platform(s) 800 (e.g., example connected devices), which are to execute the computer readable instructions 882 to implement the technique. In some examples, one or more servers of the software distribution platform 805 are communicatively connected to one or more security domains or security devices through which requests and transmissions of the example computer readable instructions 882 must pass. In some examples, one or more servers of the software distribution platform 805 periodically offer, transmit, or force updates to the software (e.g., the example computer readable instructions 882 of FIG. 8) to ensure improvements, patches, updates, etc. are distributed and applied to the software at the end user devices.

In the illustrated example of FIG. 8, the computer readable instructions 882 are stored on storage devices of the software distribution platform 805 in a particular format. A format of computer readable instructions includes, but is not limited to a particular code language (e.g., Java, JavaScript, Python, C, C#, SQL, HTML, etc.), or a particular code state (e.g., uncompiled code (e.g., ASCII), interpreted code, linked code, executable code (e.g., a binary), etc.). In some examples, the computer readable instructions 882 stored in the software distribution platform 805 are in a first format when transmitted to the example processor platform(s) 800. In some examples, the first format is an executable binary in which particular types of the processor platform(s) 800 may execute. However, in some examples, the first format is uncompiled code that requires one or more preparation tasks to transform the first format to a second format to enable execution on the example processor platform(s) 800. For instance, the receiving processor platform(s) 800 may need to compile the computer readable instructions 882 in the first format to generate executable code in a second format that is capable of being executed on the processor platform(s) 800. In still other examples, the first format is interpreted code that, upon reaching the processor platform(s) 800, is interpreted by an interpreter to facilitate execution of instructions.

Figure 9:
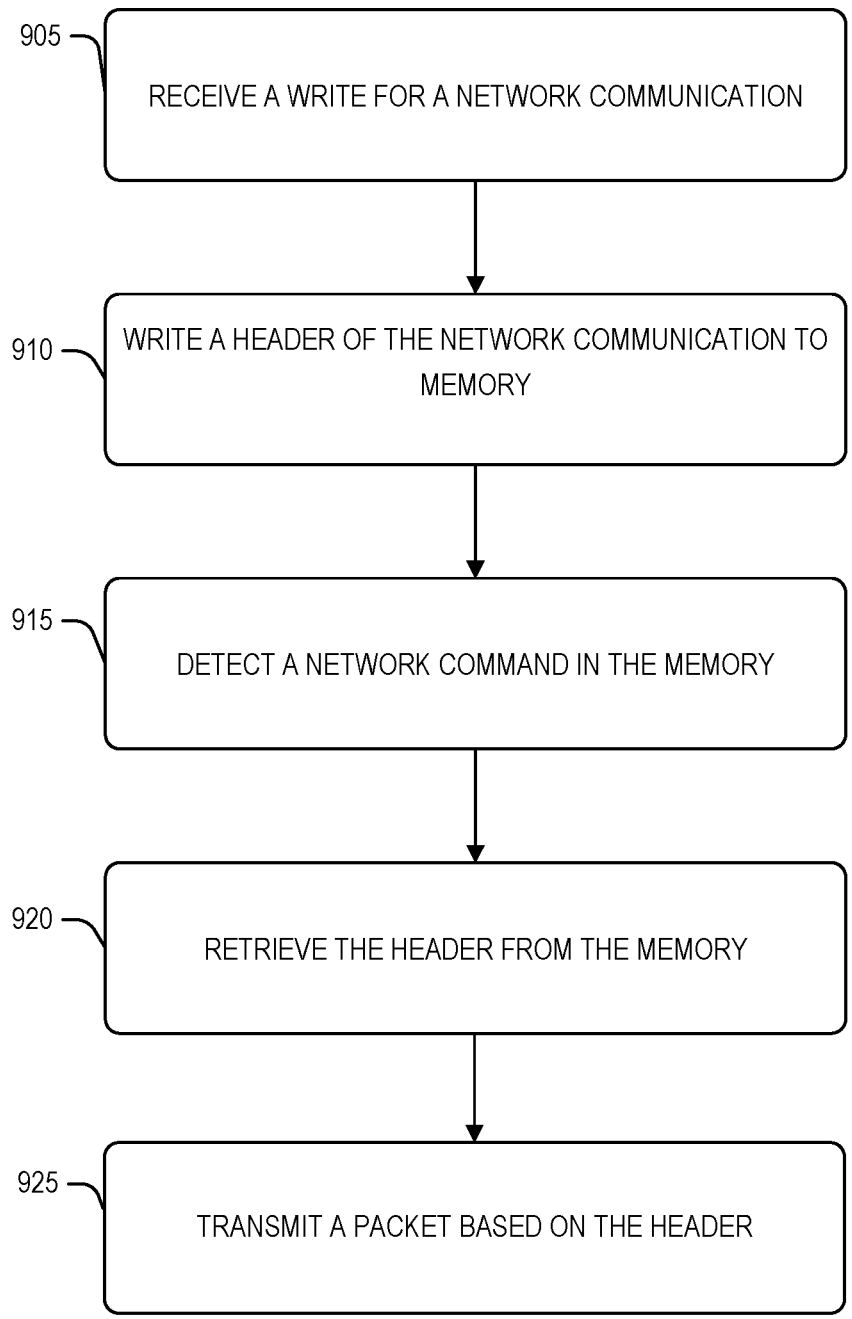
FIG. 9 illustrates a flow diagram of an example of a method for using a storage-class memory controller with a network interface, according to an embodiment.

FIG. 9 illustrates a flow diagram of an example of a method 900 for using a storage-class memory controller with a network interface, according to an embodiment. The operations of the method 900 are performed by computational hardware, such as that described above or below (e.g., processing circuitry).

At operation 905, a write for a network communication is received. In an example, a host interface of the memory device may receive the write for the network communication. Here, the network communication may include a header. The host interface may be an interface to a memory bus.

At operation 910, a portion of the network communication, e.g., the header, is written to memory. For example, the memory may be a non-volatile storage array managed by a memory controller.

At operation 915, a network command is detected by the storage-class memory device. The network command may include, e.g., a pointer to the header in the storage array. Detecting the network command may include reading a memory address of the storage class memory device allocated to the memory command.

At operation 920, the portion of the network communication such as the header is retrieved from the memory.

At operation 925, a packet based on the header retrieved from the memory is transmitted. In an example, the packet may be transmitted via a network interface of the memory controller. Transmitting the packet may result in storing a result at the memory address.

Also, a second network command may be detected. A second header retrieved from the non-volatile storage array may be recognized as specifying an accelerator. The accelerator may communicate a result, and the accelerator may be external to the storage class memory device. A second packet based on the result may be transmitted via the network interface. The accelerator may be configured to transform or packetize data.

Also, a packet may be received via a network interface of the memory controller. The packet may be depacketized into a received network communication and the received network communication may be deserialized. A header of the received network communication may be written to the non-volatile storage array. A central processing unit store write may be received by the device with an indication to bypass cache. Data corresponding to the store write may be written directly to the non-volatile storage array to bypass a volatile cache.

Figure 10:
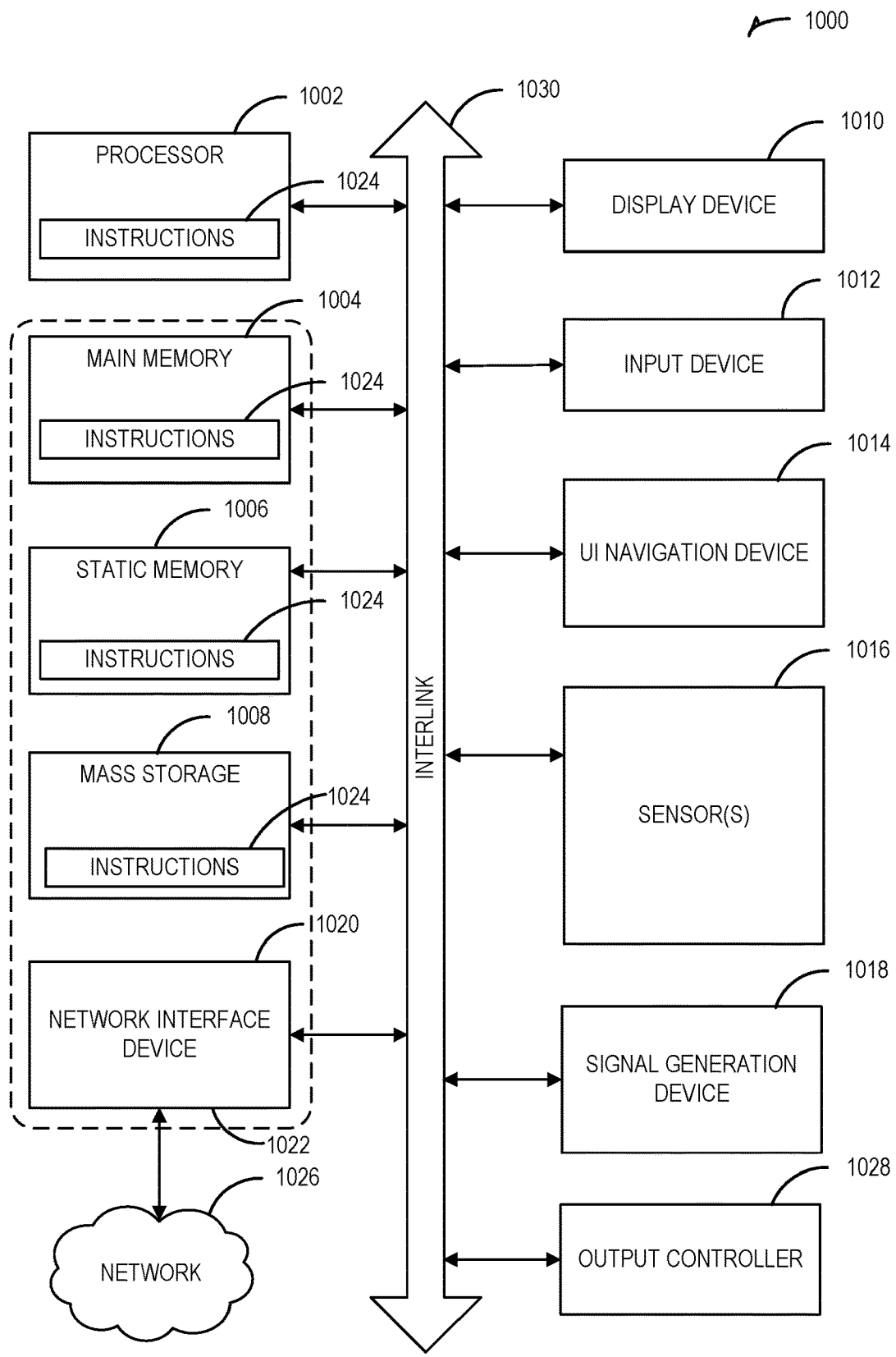
FIG. 10 is a block diagram illustrating an example of a machine upon which one or more embodiments may be implemented.

FIG. 10 illustrates a block diagram of an example machine 1000 upon which any one or more of the techniques (e.g., methodologies) discussed herein may perform. Examples, as described herein, may include, or may operate by, logic or a number of components, or mechanisms in the machine 1000. Circuitry (e.g., processing circuitry) is a collection of circuits implemented in tangible entities of the machine 1000 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1000 follow.

In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1000 may include a hardware processor 1002 (e.g., a central processing unit (CPU), a graphics processing unit (GPU), a hardware processor core, or any combination thereof), a main memory 1004, a static memory (e.g., memory or storage for firmware, microcode, a basic-input-output (BIOS), unified extensible firmware interface (UEFI), etc.) 1006, and mass storage 1008 (e.g., hard drives, tape drives, flash storage, or other block devices) some or all of which may communicate with each other via an interlink (e.g., bus) 1030. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1008, a signal generation device 1018 (e.g., a speaker), a network interface device 1020, and one or more sensors 1016, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1002, the main memory 1004, the static memory 1006, or the mass storage 1008 may be, or include, a machine readable medium 1022 on which is stored one or more sets of data structures or instructions 1024 (e.g., software) embodying or utilized by any one or more of the techniques or functions described herein. The instructions 1024 may also reside, completely or at least partially, within any of registers of the processor 1002, the main memory 1004, the static memory 1006, or the mass storage 1008 during execution thereof by the machine 1000. In an example, one or any combination of the hardware processor 1002, the main memory 1004, the static memory 1006, or the mass storage 1008 may constitute the machine readable media 1022. While the machine readable medium 1022 is illustrated as a single medium, the term "machine readable medium" may include a single medium or multiple media (e.g., a centralized or distributed database, or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 1022 may be representative of the instructions 1024, such as instructions 1024 themselves or a format from which the instructions 1024 may be derived. This format from which the instructions 1024 may be derived may include source code, encoded instructions (e.g., in compressed or encrypted form), packaged instructions (e.g., split into multiple packages), or the like. The information representative of the instructions 1024 in the machine readable medium 1022 may be processed by processing circuitry into the instructions to implement any of the operations discussed herein. For example, deriving the instructions 1024 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1024.

In an example, the derivation of the instructions 1024 may include assembly, compilation, or interpretation of the information (e.g., by the processing circuitry) to create the instructions 1024 from some intermediate or preprocessed format provided by the machine readable medium 1022. The information, when provided in multiple parts, may be combined, unpacked, and modified to create the instructions 1024. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1024 may be further transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software. A transmission medium is a machine readable medium.

ADDITIONAL NOTES & EXAMPLES

Example 1 is a storage-class memory device comprising: a host interface to receive a write for a network communication, the network communication including a header; a storage array interface to write the header to a non-volatile storage array; a network interface to communicate via a network protocol; a memory controller to: detect a network command, the network command including a pointer to the header in the storage array; retrieve, via the storage array interface, the header from the storage array; and transmit, via the network interface, a packet based on the header retrieved from the storage array.

In Example 2, the subject matter of Example 1 includes, wherein, to detect the network command, the memory controller is configured to read a memory address of the memory device allocated to the memory command.

In Example 3, the subject matter of Example 2 includes, wherein the memory controller is configured to store a result of transmitting the packet at the memory address.

In Example 4, the subject matter of Examples 1-3 includes, wherein the host interface is an interface to a memory bus.

In Example 5, the subject matter of Examples 1-4 includes, wherein the memory controller is configured to: detect a second network command; determine that a second header retrieved from the non-volatile storage array specifies an accelerator; communicate with an accelerator to get a result, the accelerator being external to the memory device; and transmit, via the network interface, a second packet based on the result.

In Example 6, the subject matter of Example 5 includes, wherein the accelerator is configured to transform or packetize data.

In Example 7, the subject matter of Examples 1-6 includes, wherein the network interface is configured to: receive a packet; and depacketizing the received packet into a received network communication; and wherein the memory controller is configured to: deserialize the received network communication included in the received packet; and write a header of the received network communication to the non-volatile storage array.

In Example 8, the subject matter of Examples 1-7 includes, wherein the memory device is one of several memory devices in a memory pool connected by network interfaces in each of the several memory devices.

In Example 9, the subject matter of Examples 1-8 includes, wherein the write is received from a thread scheduler.

In Example 10, the subject matter of Example 9 includes, wherein the thread scheduler buffers messages in the storage array via the host interface or maintains metadata buffers for network communications in the storage array via the host interface.

In Example 11, the subject matter of Examples 1-10 includes, wherein the memory controller is configured to: receive a central processing unit store write with an indication to bypass cache; and write data corresponding to the store write directly to the non-volatile storage array to bypass a volatile cache.

In Example 12, the subject matter of Example 11 includes, wherein an update to the central processing unit store is received and written to volatile cache of the storage-class memory device with write-ahead logging.

In Example 13, the subject matter of Examples 1-12 includes, wherein the storage-class memory device is in a trusted execution environment boundary of trust that includes a central processing unit connected to the storage-class memory device via the host interface.

Example 14 is a method for storage-class memory device including a network interface, the method comprising: receiving, via a host interface of the storage-class memory device, a write for a network communication, the network communication including a header; writing the header to a non-volatile storage array managed by a memory controller; detecting a network command, the network command including a pointer to the header in the storage array; retrieving the header from the storage array; and transmitting, via a network interface of the memory controller, a packet based on the header retrieved from the storage array.

In Example 15, the subject matter of Example 14 includes, wherein detecting the network command includes reading a memory address of the storage-class memory device allocated to the memory command.

In Example 16, the subject matter of Example 15 includes, storing a result of transmitting the packet at the memory address.

In Example 17, the subject matter of Examples 14-16 includes, wherein the host interface is an interface to a memory bus.

In Example 18, the subject matter of Examples 14-17 includes, detecting a second network command; determining that a second header retrieved from the non-volatile storage array specifies an accelerator; communicating with an accelerator to get a result, the accelerator being external to the storage-class memory device; and transmitting, via the network interface, a second packet based on the result.

In Example 19, the subject matter of Example 18 includes, wherein the accelerator is configured to transform or packetize data.

In Example 20, the subject matter of Examples 14-19 includes, receiving, via a network interface of the memory controller, a packet; depacketizing the received packet into a received network communication; deserializing the received network communication included in the received packet; and writing a header of the received network communication to the non-volatile storage array.

In Example 21, the subject matter of Examples 14-20 includes, wherein the storage-class memory device is one of several memory devices in a memory pool connected by network interfaces in each of the several memory devices.

In Example 22, the subject matter of Example undefined includes, wherein the thread scheduler buffers messages in the storage array via the host interface or maintains metadata buffers for network communications in the storage array via the host interface.

In Example 23, the subject matter of Examples 14-22 includes, receiving a central processing unit store write with an indication to bypass cache; and writing data corresponding to the store write directly to the non-volatile storage array to bypass a volatile cache.

In Example 24, the subject matter of Example 23 includes, wherein an update to the central processing unit store is received and written to volatile cache of the storage-class memory device with write-ahead logging.

In Example 25, the subject matter of Examples 14-24 includes, wherein the storage-class memory device is in a trusted execution environment boundary of trust that includes a central processing unit connected to the storage-class memory device via the host interface.

In Example 26, the subject matter of Examples 14-25 includes, wherein the write is received from a thread scheduler.

Example 27 is at least one machine readable medium including instructions for storage-class memory device including a network interface, the instructions, when executed by processing circuitry of the storage-class memory device, cause the processing circuitry to perform operations comprising: receiving, via a host interface of the storage-class memory device, a write for a network communication, the network communication including a header; writing the header to a non-volatile storage array managed by a memory controller; detecting a network command, the network command including a pointer to the header in the storage array; retrieving the header from the storage array; and transmitting, via a network interface of the memory controller, a packet based on the header retrieved from the storage array.

In Example 28, the subject matter of Example 27 includes, wherein detecting the network command includes reading a memory address of the storage-class memory device allocated to the memory command.

In Example 29, the subject matter of Example 28 includes, wherein the operations comprise storing a result of transmitting the packet at the memory address.

In Example 30, the subject matter of Examples 27-29 includes, wherein the host interface is an interface to a memory bus.

In Example 31, the subject matter of Examples 27-30 includes, wherein the operations comprise: detecting a second network command; determining that a second header retrieved from the non-volatile storage array specifies an accelerator; communicating with an accelerator to get a result, the accelerator being external to the storage-class memory device; and transmitting, via the network interface, a second packet based on the result.

In Example 32, the subject matter of Example 31 includes, wherein the accelerator is configured to transform or packetize data.

In Example 33, the subject matter of Examples 27-32 includes, wherein the operations comprise: receiving, via a network interface of the memory controller, a packet; depacketizing the received packet into a received network communication; deserializing the received network communication included in the received packet; and writing a header of the received network communication to the non-volatile storage array.

In Example 34, the subject matter of Examples 27-33 includes, wherein the storage-class memory device is one of several memory devices in a memory pool connected by network interfaces in each of the several memory devices.

Example 35 is a system for storage-class memory device including a network interface, the system comprising: means for receiving, via a host interface of the storage-class memory device, a write for a network communication, the network communication including a header; means for writing the header to a non-volatile storage array managed by a memory controller; means for detecting a network command, the network command including a pointer to the header in the storage array; means for retrieving the header from the storage array; and means for transmitting, via a network interface of the memory controller, a packet based on the header retrieved from the storage array.

In Example 36, the subject matter of Example 35 includes, wherein the means for detecting the network command include means for reading a memory address of the storage-class memory device allocated to the memory command.

In Example 37, the subject matter of Example 36 includes, means for storing a result of transmitting the packet at the memory address.

In Example 38, the subject matter of Examples 35-37 includes, wherein the host interface is an interface to a memory bus.

In Example 39, the subject matter of Examples 35-38 includes, means for detecting a second network command; means for determining that a second header retrieved from the non-volatile storage array specifies an accelerator; means for communicating with an accelerator to get a result, the accelerator being external to the storage-class memory device; and means for transmitting, via the network interface, a second packet based on the result.

In Example 40, the subject matter of Example 39 includes, wherein the accelerator is configured to transform or packetize data.

In Example 41, the subject matter of Examples 35-40 includes, means for receiving, via a network interface of the memory controller, a packet; means for depacketizing the received packet into a received network communication; means for deserializing the received network communication included in the received packet; and means for writing a header of the received network communication to the non-volatile storage array.

In Example 42, the subject matter of Examples 35-41 includes, wherein the storage-class memory device is one of several memory devices in a memory pool connected by network interfaces in each of the several memory devices.

In Example 43, the subject matter of Example 42 includes, wherein the thread scheduler buffers messages in the storage array via the host interface or maintains metadata buffers for network communications in the storage array via the host interface.

In Example 44, the subject matter of Examples 35-43 includes, means for receiving a central processing unit store write with an indication to bypass cache; and means for writing data corresponding to the store write directly to the non-volatile storage array to bypass a volatile cache.

In Example 45, the subject matter of Example 44 includes, wherein an update to the central processing unit store is received and written to volatile cache of the storage-class memory device with write-ahead logging.

In Example 46, the subject matter of Examples 35-45 includes, wherein the storage-class memory device is in a trusted execution environment boundary of trust that includes a central processing unit connected to the storage-class memory device via the host interface.

In Example 47, the subject matter of Examples 35-46 includes, wherein the write is received from a thread scheduler.

Example 48 is at least one machine-readable medium including instructions that, when executed by processing circuitry, cause the processing circuitry to perform operations to implement of any of Examples 1-47.

Example 49 is an apparatus comprising means to implement of any of Examples 1-47.

Example 50 is a system to implement of any of Examples 1-47.

Example 51 is a method to implement of any of Examples 1-47.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A storage-class memory device comprising:
a host interface to receive a write for a network communication, the network communication including a header;
a storage array interface to write the header to a non-volatile storage array;
a network interface to communicate via a network protocol; and
a memory controller to:
detect a network command, the network command including a pointer to the header in the non-volatile storage array;
retrieve, via the storage array interface, the header from the non-volatile storage array; and
transmit, via the network interface, a packet based on the header retrieved from the non-volatile storage array.

2. The storage-class memory device of claim 1, wherein, to detect the network command, the memory controller is configured to read a memory address of the memory device allocated to the memory command.

3. The storage-class memory device of claim 2, wherein the memory controller is configured to store a result of transmitting the packet at the memory address.

4. The storage-class memory device of claim 1, wherein the host interface is an interface to a memory bus.

5. The storage-class memory device of claim 1, wherein the memory controller is configured to:
detect a second network command;
determine that a second header retrieved from the non-volatile storage array specifies an accelerator;
communicate with an accelerator to get a result, the accelerator being external to the memory device; and
transmit, via the network interface, a second packet based on the result.

6. The storage-class memory device of claim 5, wherein the accelerator is configured to transform or packetize data.

7. The storage-class memory device of claim 1 wherein the network interface is configured to:
receive a packet; and
depacketize the received packet into a received network communication; and
wherein the memory controller is configured to:
deserialize the received network communication included in the received packet; and
write a header of the received network communication to the non-volatile storage array.

8. The storage-class memory device of claim 1, wherein the memory device is one of several memory devices in a memory pool connected by network interfaces in each of the several memory devices.

9. The storage-class memory device of claim 1, wherein the write is received from a thread scheduler.

10. The storage-class memory device of claim 9, wherein the thread scheduler buffers messages in the non-volatile storage array via the host interface or maintains metadata buffers for network communications in the non-volatile storage array via the host interface.

11. The storage-class memory device of claim 1, wherein the memory controller is configured to:
receive a central processing unit store write with an indication to bypass cache; and
write data corresponding to the store write directly to the non-volatile storage array to bypass a volatile cache.

12. The storage-class memory device of claim 11, wherein an update to the central processing unit store is received and written to the volatile cache of the storage-class memory device with write-ahead logging.

13. The storage-class memory device of claim 1, wherein the storage-class memory device is in a trusted execution environment boundary of trust that includes a central processing unit connected to the storage-class memory device via the host interface.

14. At least one non-transitory machine readable medium including instructions for storage-class memory device including a network interface, the instructions, when executed by processing circuitry of the storage-class memory device, cause the processing circuitry to perform operations comprising:
receiving, via a host interface of the storage-class memory device, a write for a network communication, the network communication including a header;
writing the header to a non-volatile storage array managed by a memory controller;

detecting a network command, the network command including a pointer to the header in the non-volatile storage array;

retrieving the header from the non-volatile storage array; and transmitting, via a network interface of the memory controller, a packet based on the header retrieved from the non-volatile storage array.

15. The at least one non-transitory machine readable medium of claim 14, wherein detecting the network command includes reading a memory address of the storage-class memory device allocated to the memory command.

16. The at least one non-transitory machine readable medium of claim 15, wherein the operations comprise storing a result of transmitting the packet at the memory address.

17. The at least one non-transitory machine readable medium of claim 14, wherein the host interface is an interface to a memory bus.

18. The at least one non-transitory machine readable medium of claim 14, further wherein the operations comprise:

detecting a second network command;

determining that a second header retrieved from the non-volatile storage array specifies an accelerator;

communicating with an accelerator to get a result, the accelerator being external to the storage-class memory device; and transmitting, via the network interface, a second packet based on the result.

19. The at least one non-transitory machine readable medium of claim 18, wherein the accelerator is configured to transform or packetize data.

20. The at least one non-transitory machine readable medium of claim 14 wherein the operations comprise:

receiving, via a network interface of the memory controller, a packet;

depacketizing the received packet into a received network communication;

deserializing the received network communication included in the received packet; and writing a header of the received network communication to the non-volatile storage array.

21. The at least one non-transitory machine readable medium of claim 14, wherein the storage-class memory device is one of several memory devices in a memory pool connected by network interfaces in each of the several memory devices.

22. A system for storage-class memory device including a network interface, the system comprising:

means for receiving, via a host interface of the storage-class memory device, a write for a network communication, the network communication including a header;

means for writing the header to a non-volatile storage array managed by a memory controller;

means for detecting a network command, the network command including a pointer to the header in the non-volatile storage array;

means for retrieving the header from the non-volatile storage array; and means for transmitting, via a network interface of the memory controller, a packet based on the header retrieved from the non-volatile storage array.

23. The system of claim 22, wherein the means for detecting the network command include means for reading a memory address of the storage-class memory device allocated to the memory command.

24. The system of claim 23, comprising means for storing a result of transmitting the packet at the memory address.

25. The system of claim 22, wherein the host interface is an interface to a memory bus.

26. The system of claim 22, comprising:

means for detecting a second network command;

means for determining that a second header retrieved from the non-volatile storage array specifies an accelerator;

means for communicating with an accelerator to get a result, the accelerator being external to the storage-class memory device; and means for transmitting, via the network interface, a second packet based on the result.

27. The system of claim 26, wherein the accelerator is configured to transform or packetize data.

28. The system of claim 22, comprising:

means for receiving, via a network interface of the memory controller, a packet;

means for depacketizing the received packet into a received network communication;

means for deserializing the received network communication included in the received packet; and means for writing a header of the received network communication to the non-volatile storage array.

29. The system of claim 22, wherein the storage-class memory device is one of several memory devices in a memory pool connected by network interfaces in each of the several memory devices.

* * * * *